(12) United States Patent
Kato et al.

(10) Patent No.: US 7,574,576 B2
(45) Date of Patent: Aug. 11, 2009

(54) SEMICONDUCTOR DEVICE AND METHOD OF CONTROLLING THE SAME (75) Inventors: Kenta Kato, Aichi (JP); Masahiko Okura, Aichi (JP); Kenji Shibata, Aichi (JP); Mitsuhiro Nagao, Aichi (JP); Stewart Wang, Fremont, CA (US)

(73) Assignee: Spansion LLC, Sunnyvale, CA (US)

( * ) Notice: Subject to any disclaimer, the term of this patent is extended or adjusted under 35 U.S.C. 154(b) by 364 days.

(21) Appl. No.: 11/644,161

(22) Filed: Dec. 22, 2006

(65) Prior Publication Data
US 2008/0155217 A1 Jun. 26, 2008

(51) Int. Cl.
*G06F 12/00* (2006.01)
(52) U.S. Cl. ..................................... 711/163
(58) Field of Classification Search ........................ None
See application file for complete search history.

(56) References Cited
U.S. PATENT DOCUMENTS 5,680,581 A * 10/1997 Banno et al. .................. 710/38
7,054,990 B1 * 5/2006 Tamura et al. ............... 711/103

FOREIGN PATENT DOCUMENTS

| JP | 01266645 | 10/1989 |
| JP | 11086568 | 3/1999 |
| JP | 2001319484 | 11/2001 |
| JP | 2002269988 | 9/2002 |
| JP | 2003249080 | 9/2003 |

* cited by examiner

*Primary Examiner*—Hiep T Nguyen (57) ABSTRACT

A semiconductor device includes: a memory cell array that includes non-volatile memory cells; a first memory region and a second memory region that are located in the memory cell array, the first memory region being protected during a protecting period, the second memory region being not protected; an address change circuit that changes an address in an address space of the first memory region and the second memory region in the memory cell array, to an address in an address space of the second memory region, during the protecting period; and a control circuit that prohibits access to the first memory region, and allows access to the second region, during the protecting period.

10 Claims, 11 Drawing Sheets

| NODE | Read protect signal | Address for sectors | Address for WL |
|---|---|---|---|
| A: | 0 or 1 | [A22] --- [A15] | [A14] --- [A0] |
| B: | 0 or 1 | [A22B] --- [A15B] | [A14B] --- [A0B] |
| C: | 0 or 1 | | [A14B] --- [A0B] |
| D: | 0 or 1 | | [A14] --- [A0] |
| E: | 0 | [A22B] --- [A15B] | |
| F: | 0 | [A22] --- [A15] | |
| E: | 1 | [A22B] --- [A15B] | |
| F: | 1 | [0] --- [0] | |

| NODE | Read protect signal | Address for sectors | Address for WL |
|---|---|---|---|
| a: | 0 or 1 | [A22] --- [A15] | [A14] --- [A0] |
| b: | 0 or 1 | [A22B] --- [A15B] | [A14B] --- [A0B] |
| c: | 0 or 1 | | [A14B] --- [A0B] |
| d: | 0 or 1 | | [A14] --- [A0] |
| e, e': | 0 | [A22B] --- [A15B] | |
| f, f': | 0 | [A22] --- [A15] | |
| e, e': | 1 | [1] --- [0] | |
| f, f': | 1 | [0] --- [1] | |

SEMICONDUCTOR DEVICE AND METHOD OF CONTROLLING THE SAME

BACKGROUND OF THE INVENTION

1. Field of the Invention

The present invention generally relates to a semiconductor device and a method of controlling the semiconductor device, and more particularly, to a semiconductor device having non-volatile memory cells and a method of controlling the semiconductor device.

2. Description of the Related Art

In recent years, non-volatile memories that are semiconductor devices in which data can be rewritten have been widely used for various electronic devices such as portable telephone devices and digital cameras. A flash memory that is a typical non-volatile memory accumulates charges in the charge accumulation layers of the memory cells so as to write data into the memory cells in a non-volatile manner. The data can be erased by eliminating the charges from the charge accumulation layers. Some non-volatile memories have protection functions for prohibiting writing and erasing of data in the memory cells and reading of the data from the memory cells for security reasons.

In this specification, data writing (data being "0", and the threshold voltage of a subject memory cell being increased) or data erasing (data being "1", and the threshold voltage of a subject memory cell being lowered) is referred to as "programming". Also, programming of data in a subject memory cell (data "1" being changed to "0", or data "0" being changed to "1"), writing of data into a subject memory cell (data "1" being changed to "0"), erasing of data in a subject memory cell (data "0" being changed to "1"), and reading (data "0" or "1" being output) are called memory cell programming, memory cell writing, memory cell erasing, and memory cell reading, respectively. Further, programming, writing, erasing, and reading of data in and from the memory cells in a subject memory region that includes two or more memory cells are called memory region programming, memory region writing, memory region erasing, and memory region reading, respectively.

As a structure for prohibiting reading from memory cells, Japanese Unexamined Patent Publication No. 2003-249080 (Patent Document 1) discloses a non-volatile memory that has a read protection function for prohibiting detection of a memory element with an address signal once the protection function is activated, and has address spaces divided into a space having a read protection function and a space not having a read protection function.

Japanese Unexamined Patent Publication No. 01-266645 (Patent Document 2) discloses a ROM that is equipped with an address change unit for changing an input address to a different address, stores regular data, and protects the regular data by the address change unit outputting an unchanged address only when an input password matches a predetermined password. Japanese Unexamined Patent Publication No. 11-86568 (Patent Document 3) discloses a programmable ROM that stores top-boot type information and bottom-boot type information. This programmable ROM has a switching signal generating circuit 3 that rearranges an address signal A0 . . . Am input in a bottom-boot format into an address in a top-boot format during the final test after the assembling in accordance with the boot-type information written from the outside, and selectively provide the converted address to an address decoder.

In a system including a non-volatile memory that performs read protection through password authentication, regular data stored in the non-volatile memory is protected by a protection function such as a password authenticating function at the time of system boot, as disclosed in Patent Documents 1 and 2. However, in a non-volatile memory that stores a boot code such as code data or program data for booting a system, the boot code needs to be read out without read protection. Furthermore, in a case where regular data and a boot code are stored in the same non-volatile memory, the boot code needs to the stored in all the sectors corresponding to various memory controllers. In other words, it is necessary to record the boot code in different sectors in accordance with the types of memory controllers.

Although the technique disclosed in Patent Document 3 was developed as the means to counter the above problem, it is necessary to secure a process and a storage region for storing the boot type information as to various memory controllers accordingly to Patent Document 3. While disclosing a ROM having address spaces divided into a space having a read protection function and a space not having a read protection function, Patent Document 1 does not disclose a method of processing addresses that vary with the types of memory controllers in the boot-code memory region that is not read-protected. On the other hand, the present invention can provide a semiconductor device and a method of controlling the semiconductor device that can eliminate the necessity of storing data to be read, such as a boot code, in different sectors in accordance with the different types of memory controllers, and can also eliminate the process for writing the boot type information as to the memory controllers of various types from the outside during the final test after the assembling, in a case where the boot code and regular data are stored in the same non-volatile memory.

SUMMARY OF THE INVENTION

It is therefore an object of the present invention to provide a semiconductor device and a method of controlling the semiconductor device in which the above disadvantages are eliminated.

A more specific object of the present invention is to provide a semiconductor device that does not need to store data to be read, such as a boot code, in different sectors for different types of memory controllers, and a method of controlling such a semiconductor device.

According to an aspect of the present invention, there is provided a semiconductor device including: a memory cell array that includes non-volatile memory cells; a first memory region and a second memory region that are located in the memory cell array, the first memory region being protected during a protecting period, the second memory region being not protected; an address change circuit that changes an address in an address space of the first memory region and the second memory region in the memory cell array, to an address in an address space of the second memory region, during the protecting period; and a control circuit that prohibits access to the first memory region, and allows access to the second region, during the protecting period. In accordance with the present invention, a semiconductor device that does not need to store data to be read in different sectors for different types of memory controllers can be provided.

The semiconductor device may be configured so that the address change circuit changes an external address that indicates the first memory region and is input to the semiconductor device, to an internal address that indicates the second memory region in the memory cell array.

The semiconductor device may be configured so that the control circuit allows access to the first memory region, when authentication data that is read from an authentication data storage region for storing the authentication data matches external authentication data that is input from the outside.

The semiconductor device may be configured so that the address change circuit does not change the address, when authentication data that is read from an authentication data storage region for storing the authentication data matches external authentication data that is input from the outside.

The semiconductor device may be configured so that the address change circuit changes a section address indicating a memory region to an address indicating the second memory region, but does not change an address in the memory region, the section address being an address in the memory cell array.

The semiconductor device may be configured so that the address change circuit changes a section address indicating the first memory region to a section address indicating the second memory region.

The semiconductor device may be configured so that the second memory region is a boot data region in which a system code or program is stored.

According to another aspect of the present invention, there is provided a method of controlling a semiconductor device that has a memory cell array including non-volatile memory cells, a first memory region that is to be protected during a protecting period, and a second memory region that is not to be protected, the first memory region and the second memory region being located in the memory cell array, the method comprising the steps of: changing an address in an address space of the first memory region and the second memory region in the memory cell array, to an address in an address space of the second memory region, during the protecting period; and prohibiting access to the first memory region, and allowing access to the second memory region, during the protecting period. In accordance with the present invention, a method of controlling a semiconductor device that does not need to store data to be read in different sectors for different types of memory controllers can be provided.

The method may further include the step of allowing access to the first memory region, when authentication data that is read from an authentication data storage region for storing the authentication data matches external authentication data that is input from the outside.

The above method may be configured so that the address is not changed, when authentication data that is read from an authentication data storage region for storing the authentication data matches external authentication data that is input from the outside.

As described above, the present invention can provide a semiconductor device and a method of controlling a semiconductor device that can eliminate the necessity of storing data to be read, such as a boot code, in different sectors for different types of memory controllers, can omit the process and the storage region for storing information such as boot type information, and can change all the address spaces to a particular address space during the protecting period, so as to achieve high security.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a description of embodiments of the present invention, with reference to the accompanying drawings.

First Embodiment

A first embodiment of the present invention is an example of a non-volatile memory that has normal sectors that are read-protected (or protected) at the time of system boot (or during a protecting period), and a boot sector that is not read-protected. In the first embodiment, at the time of system boot, the boot code is read from the boot sector, as the normal sectors are read-protected. The boot sector is a boot data region in which a system code or program is stored. In accordance with a read protection canceling command that is output from a memory controller, an internal password is read from a password storage region in the non-volatile memory. If the internal password matches an external password that is output from the memory controller for canceling read protection, the read protection in the normal sectors is canceled. The internal password can be read only with the read protection canceling command, and accordingly, is not output to any external terminal outside the non-volatile memory. The internal password is input to a determining circuit that is provided in a read control circuit (described later) in the non-volatile memory and determines whether the internal password matches the external password.

Figure 1:
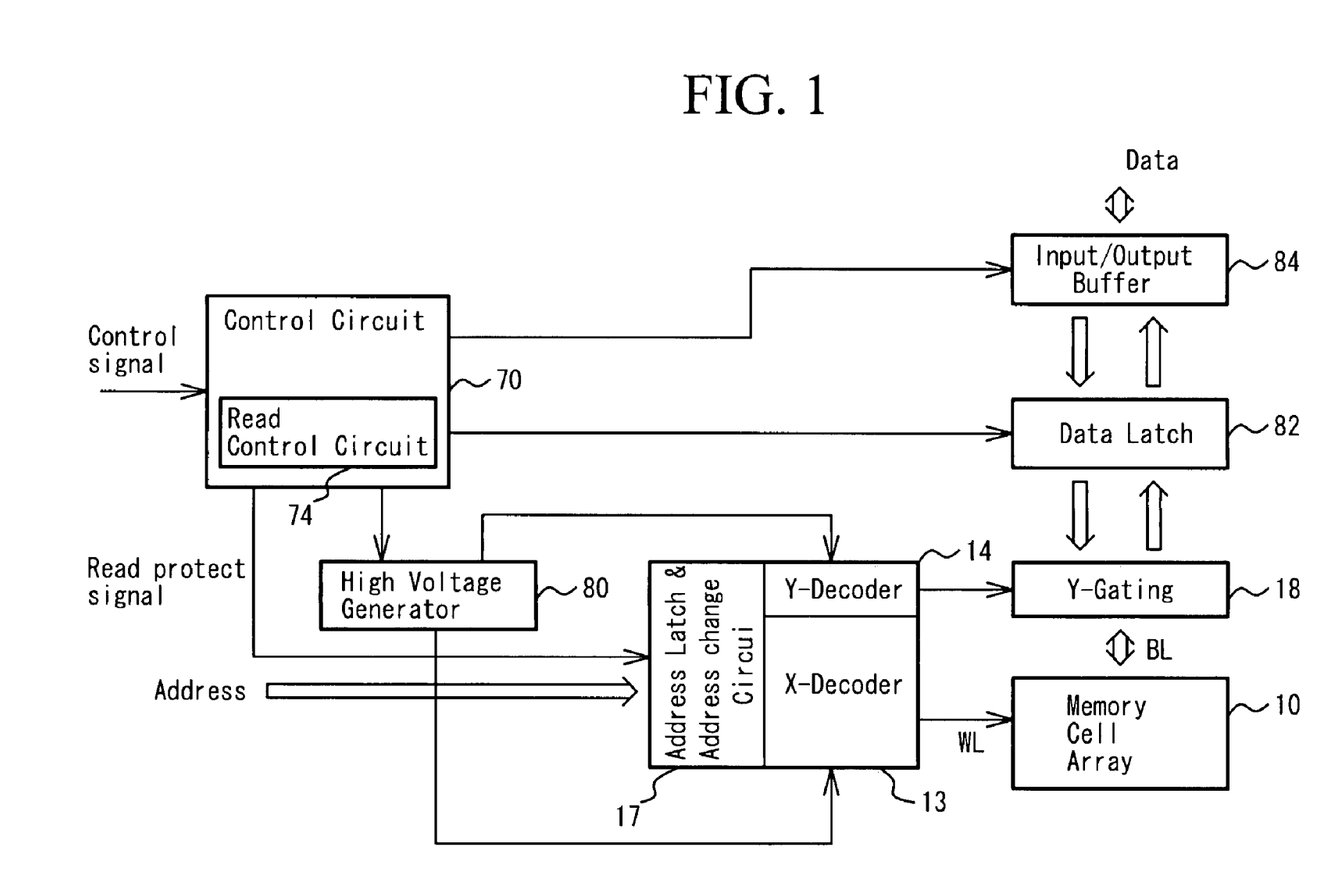
FIG. 1 is a block diagram of a non-volatile memory in accordance with a first embodiment of the present invention.

FIG. 1 is a block diagram of a non-volatile memory in accordance with the first embodiment. In a memory cell array 10, non-volatile memory cells connected to word lines WL and bit lines BL are arranged in a matrix fashion. In accordance with an address signal that is input from an external circuit to an address latch and address change circuit 17, an X-decoder 13 selects a word line WL, and a Y-decoder 14 selects a bit line BL via a Y-gate 18. Data that are input from an external circuit to an input/output buffer 84 and data that are to be output to an external circuit through the input/output buffer 84 are latched by a data latch 82. The data is programmed or read into the memory cell connected to the bit line BL selected by the Y-gate 18 and the word line WL selected by the X-decoder 13. In accordance with a control command that is input from an external circuit to a control circuit 70, a read control circuit 74 in the control circuit 70 controls the input/output buffer 84 and the data latch 82. The control circuit 70 also controls a high voltage generator 80. The high voltage generator 80 supplies a high voltage for reading data into the memory cells via the Y-decoder 14 and the X-decoder 13. In a case where read protection is to be performed, the read control circuit 74 outputs a read protection signal to the address latch and address change circuit 17.

Figure 2:
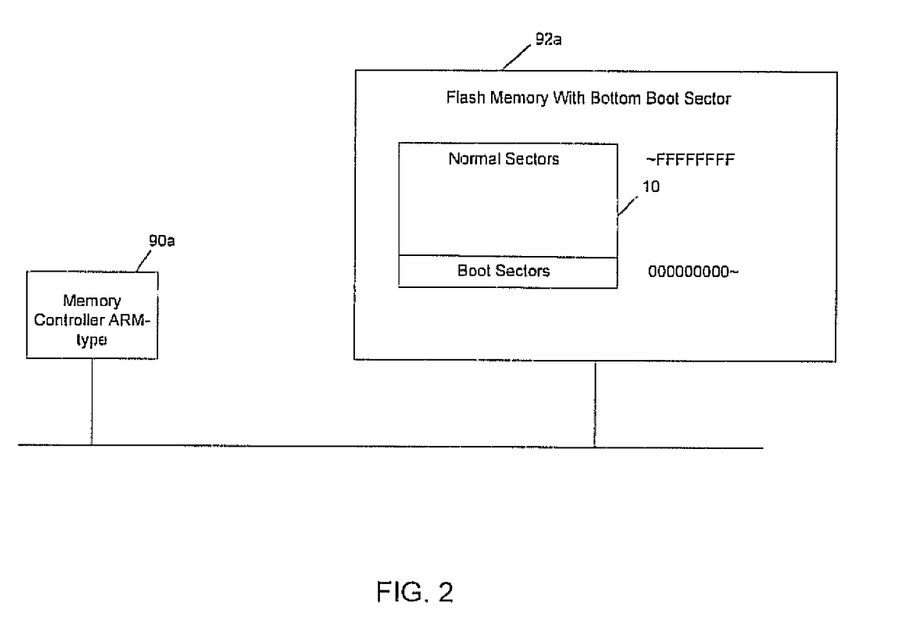
FIG. 2 illustrates an example of a system that includes the non-volatile memory.

To describe the non-volatile memory in accordance with the first embodiment in greater detail, FIG. 2 shows a system to which the non-volatile memory is connected. As shown in FIG. 2, a non-volatile memory 92a is controlled by a memory controller 90a of an ARM type. The memory cell array 10 is divided into a boot sector and a normal sector. Regular data is recorded in the normal sector. A boot code is recorded in the boot sector. The boot sector is provided at the bottom (at address 0000 0000 ~) of the memory cell array 10. At the time of system boot, the memory controller 90a acquires the boot code from the boot sector at the bottom of the memory cell array 10 of the non-volatile memory 92a.

Figure 3:
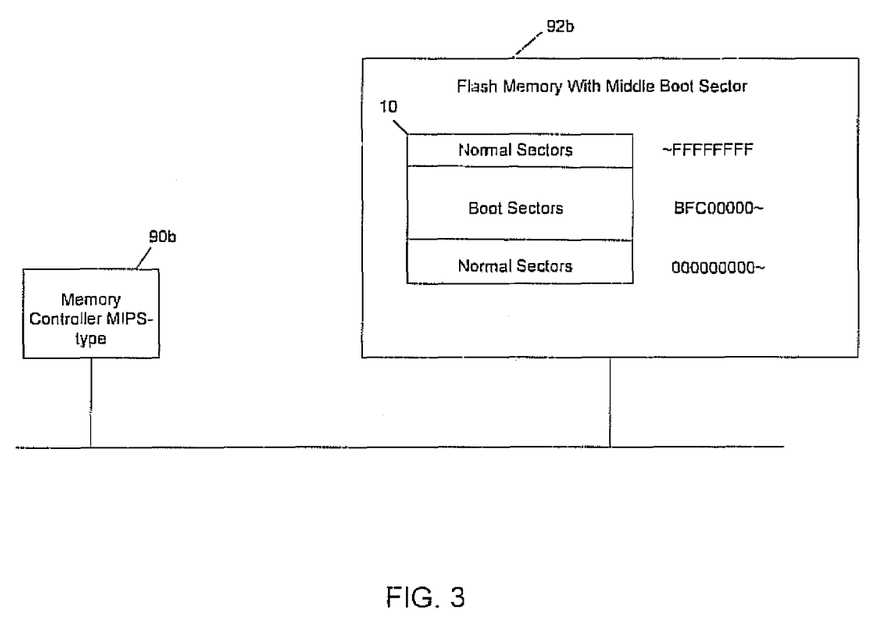
FIG. 3 illustrates another example of a system that includes the non-volatile memory.
Figure 4:
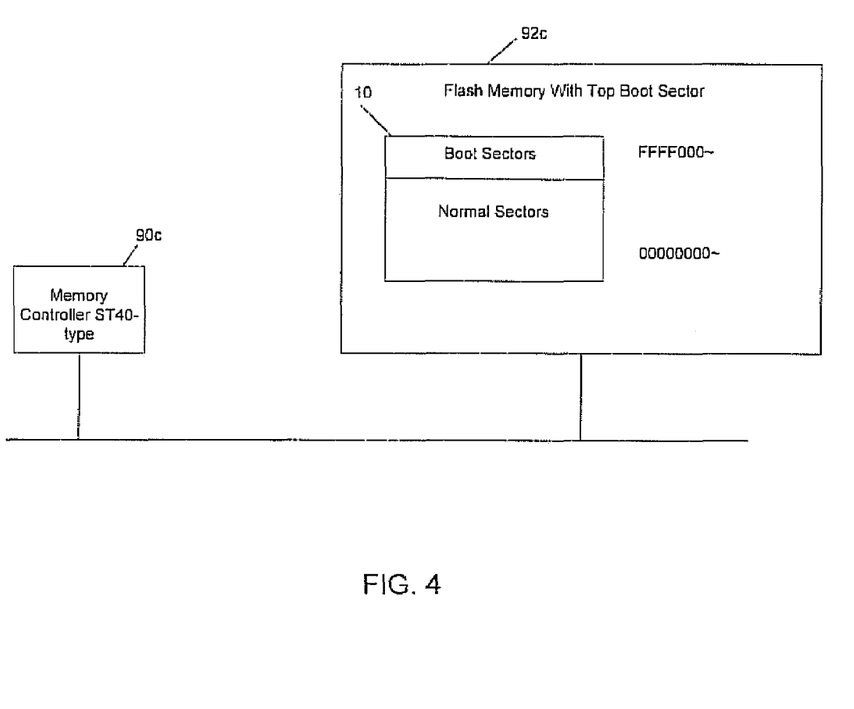
FIG. 4 illustrates yet another example of a system that includes the non-volatile memory.

As shown in FIG. 3, a non-volatile memory 92b is controlled by a memory controller 90b of a MIPS type. A boot sector is provided in the middle (at address BFC0 0000 ~) of the memory cell array 10. As shown in FIG. 4, a non-volatile memory 92c is controlled by a memory controller 90c of a ST40 type. A boot sector is provided at the top (at address ~FFFF FFFF) of the memory cell array 10. In the systems shown in FIGS. 3 and 4, the memory controllers 90b and 90c each acquire the boot code from the boot sector at the time of system boot. In this manner, the address of the boot sector from which the boot code is to be obtained varies with the types of memory controllers.

Figure 5:
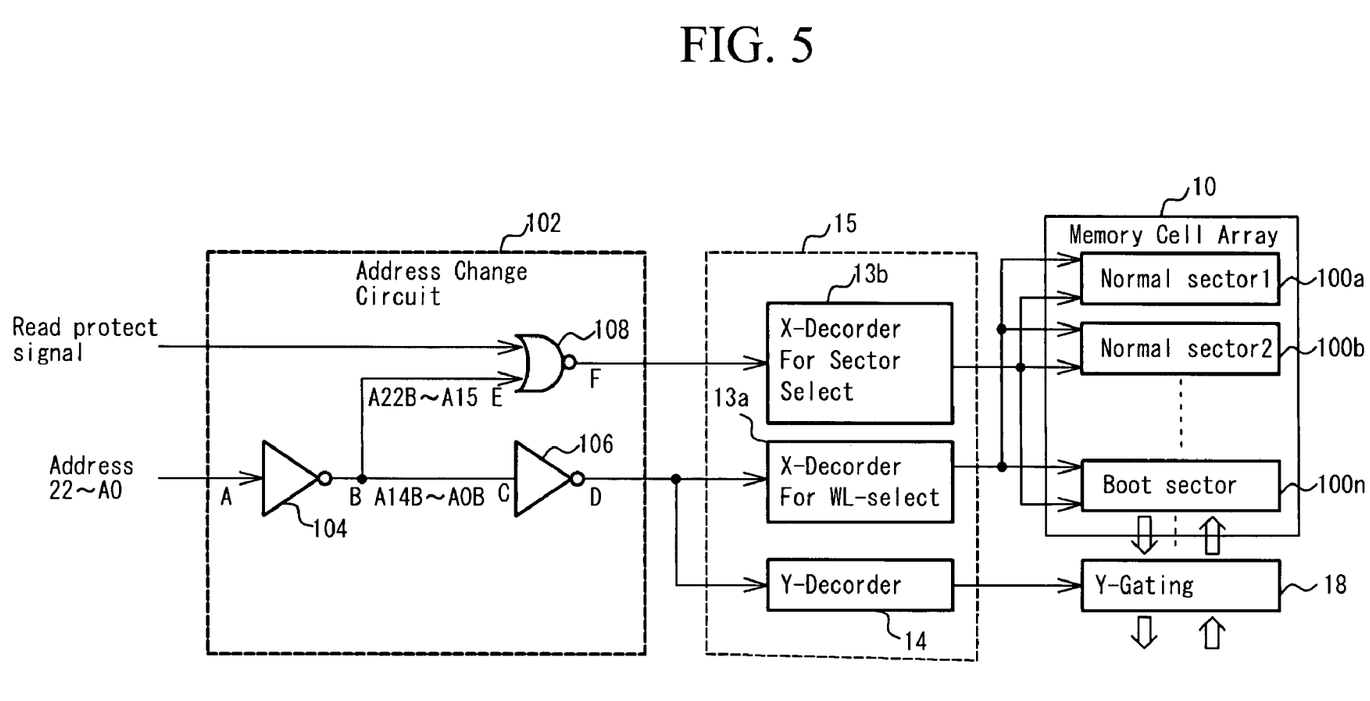
FIG. 5 is a block diagram illustrating the address change circuit and its surroundings in the non-volatile memory in accordance with the first embodiment.

Next, the operation of the address change circuit in the address latch and address change circuit 17 is described. FIG. 5 is a block diagram illustrating the address change circuit 102 and its surroundings. A read protection signal and an address are input to the address change circuit 102. If the read protection signal is "1", data reading from the normal sector is disabled. If the read protection signal is "0", data reading from the normal sector is enabled. Among the 23 bits (A22 . . . A0) of the address data, the 15 bits (A14 . . . A0) representing the address in the sector are input to a X-decoder 13a for selecting a word line WL in the sector and the Y-decoder 14 via an inverter 104 and an inverter 106. The X-decoder 13a for selecting a word line WL selects a word line WL in the sector. The Y-decoder 14 selects a bit line BL via the Y-gate 18. Among the address data, the 8 bits (A22 . . . A15) representing the address of the sector are inverted by the inverter 104, and are then input, together with a read protect signal, to a X-decoder 13b for sector selection via a NOR circuit 108. The X-decoder 13b for sector selection selects a sector from normal sectors 100a, 100b, . . . , and a boot sector 100n in the memory cell array 10.

Figure 6:
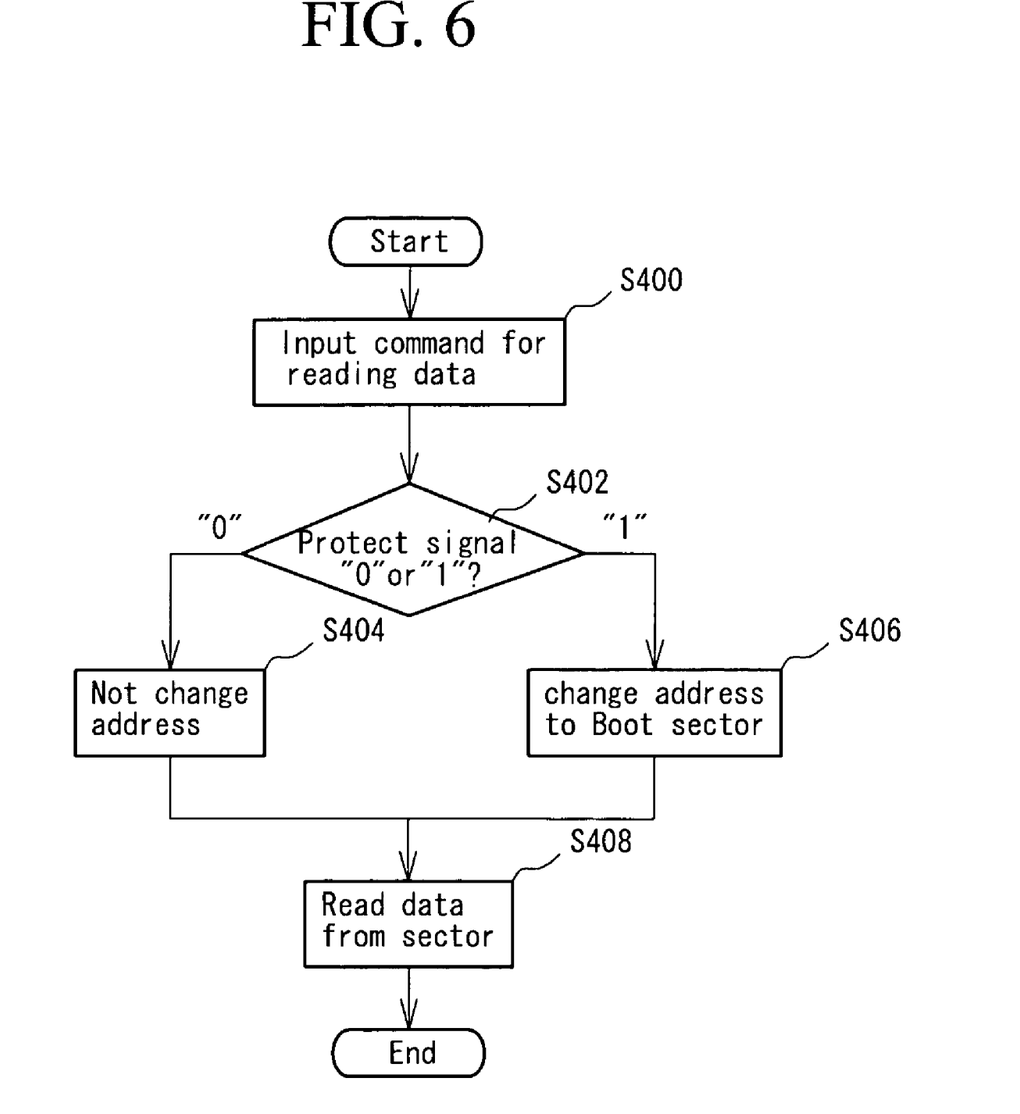
FIG. 6 is a flowchart of the operation to be performed when data is read out from the non-volatile memory in accordance with the first embodiment.

FIG. 6 is a flowchart of an operation to be performed when a read command for reading data from the memory cell array 10 is input to the read control circuit 74. First, a command for reading data is input to the read control circuit 74 (step S400). The read control circuit 74 outputs a read protect signal to the address change circuit 102, depending on whether reading is protected. If the read protection signal is "1", reading from the normal sectors is protected. If the read protection signal is "0", reading from the normal sectors is not protected.

The address change circuit 102 determines whether the read protection signal is "0" or "1" (step S402). If the read protection signal is "0", the address change circuit 102 does not change the input address (step S404). The read control circuit 74 then reads data from the sector at the input address (step S408). If the read protection signal is "1", the address change circuit 102 converts the input sector address to the address of the boot sector (step S406). The read control circuit 74 then reads data from the boot sector (step S408).

Figure 7:
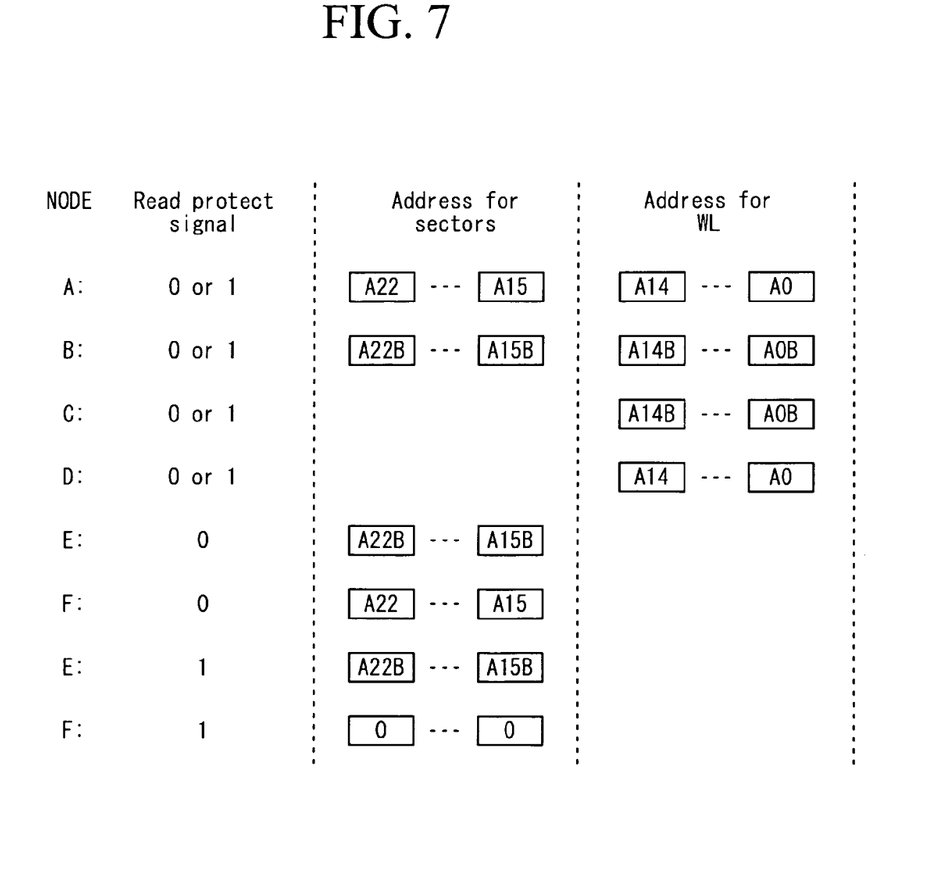
FIG. 7 illustrates the operation of the address change circuit of the non-volatile memory in accordance with the first embodiment.

Referring now to FIG. 7, the procedures of steps S402 through S406 of FIG. 6 carried out by the address change circuit 102 are described. FIG. 7 shows the address data at the nodes A through F shown in FIG. 5. At the node A, the sector address represented by A22 . . . A15 and the WL address (including the Y address) represented by A14 . . . A0 are input, regardless of the read protection signal. At the node B, the address data are inverted by the inverter 104, to obtain A22B . . . A15B and A14B . . . A0B. At the node C, only the WL address represented by A14B . . . A0B of the address data is input. At the node D, the WL address data is inverted by the inverter 106, to obtain A4 . . . A0. In this manner, the WL address data A4 . . . A0 is input to the WL-selecting X-decoder 13a and the Y-decoder 14, regardless of the read protection signal.

Meanwhile, at the node E, the sector address represented by A22B . . . A15B is input to the NOR circuit 108. The read protection signal is also input to the NOR circuit 108. At the node F, if the read protection signal is "0" (reading is not to be protected), the NOR circuit 108 outputs the sector address represented by A22 . . . A15 to the sector-selecting X-decoder 13b. If the read protection signal is "1" (reading is to be protected) at the node F, the NOR circuit 108 outputs the sector address "0" . . . "0" to the sector-selecting X-decoder 13b.

Figure 8:
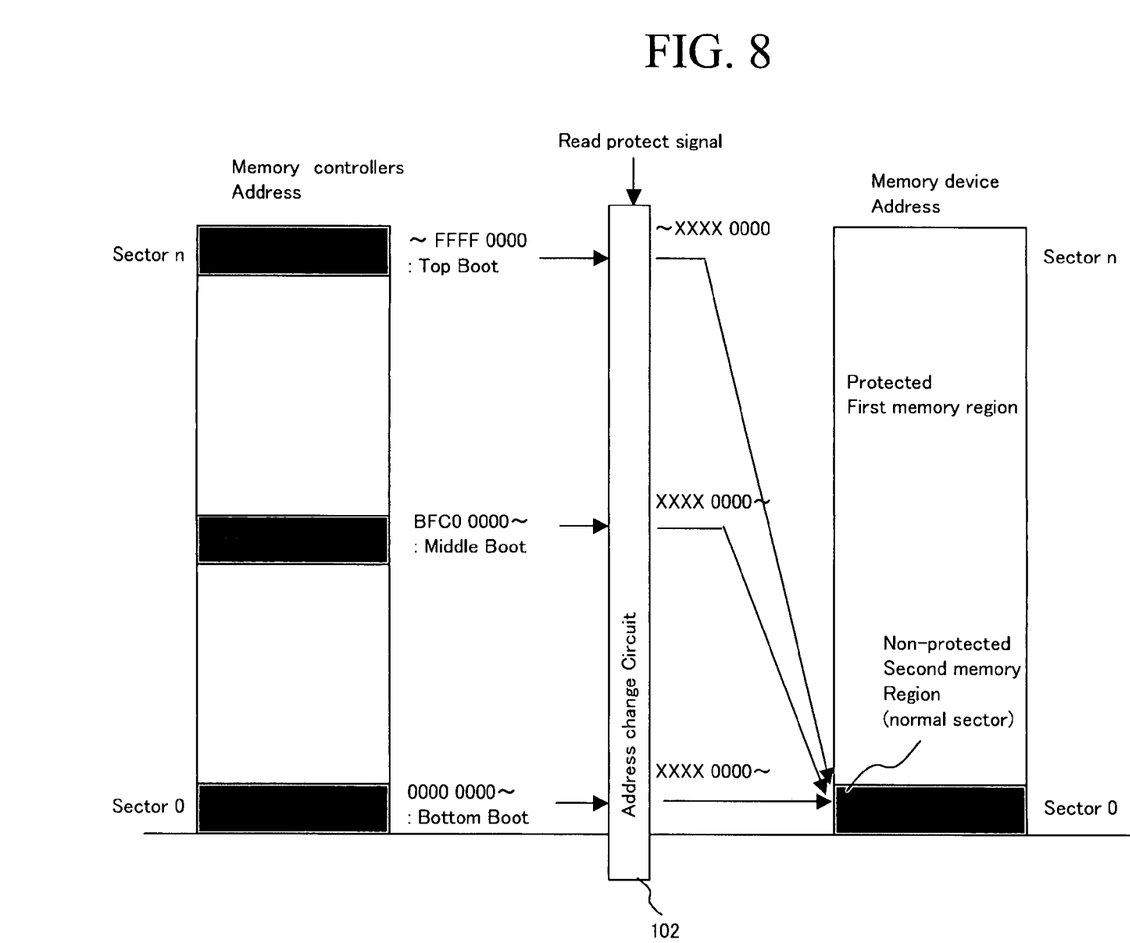
FIG. 8 shows the address spaces of memory controllers and the memory cell array.

The functions of the read control circuit 74 and the address change circuit 102 are illustrated in FIG. 8. The left half of FIG. 8 shows address spaces of memory controllers. The right half of FIG. 8 shows address spaces for protected normal sectors (first regions) and an unprotected boot sector (a second region) of the memory cell array 10. The address change circuit 102 converts an address in a memory controller address space to an address in an address space of the memory cell array 10. A memory controller has a boot address among all the addresses 0000 0000 . . . FFFF FFFF corresponding to the normal sectors and the boot sector in the memory cell array 10. The boot address varies among memory controllers. In FIG. 8, boot addresses of memory controllers of three different types are shown as a bottom boot address, a middle boot address, and a top boot address. The address change circuit 102 changes any of the three boot addresses to the address of a particular boot sector in the memory cell array 10.

The address spaces of the memory cell array 10 are divided into spaces having a read protection function (to be read-protected) and spaces not having a read protection function (not to be read-protected). The two spaces are used as the bases for converting addresses by the address change circuit 102. More specifically, an address in the read-protected address space is converted to an address in the address space that is not read-protected. The former of the two spaces is a first memory region in which regular data requiring authentication is stored and protected. The latter of the two spaces is an unprotected second memory region in which system code data and program data are stored and can be read out without authentication at the time of system boot. With this arrangement, the one boot address space can cope with various memory controllers, without the process of storing boot type information (the address information of boot data that varies with the types of memory controllers, such as the ARM type, the MIPS type, and the ST40 type) and the memory region for storing the boot type information. Further, as the address change circuit 102 changes all the address spaces to a particular address space, a synergetic effect of achieving a higher security level can be expected, unless the read control circuit 74 is hacked for the authentication data.

As described above, the memory cell array 10 has the normal sectors (the first memory region) and the boot sector (the second memory region). If a read protection signal "1" is input (or during a protecting period), the address change circuit 102 changes the address A22 . . . A15 in all the address spaces 0000 0000 . . . FFFF FFFF of the normal sectors and the boot sector in the memory cell array 10 to the address 0 . . . 0 in the address space of the second memory region. The read control circuit 74 (the control circuit) prohibits data reading from (or access to) the normal sectors, and accesses the boot sector for the data to be read out from the memory cell array 10. With this structure, if reading is protected, reading from the normal sectors is prohibited, and data can be read from the unprotected boot sector. For example, in a case where the non-volatile memory is connected to any one of the memory controllers shown in FIGS. 2, 3, and 4, the boot code can be read from the boot sector.

The address change circuit 102 also changes an external address that is input from an external memory controller, to an internal address of the memory cell array 10. The external address indicates a normal sector, but the external address indicates the boot sector.

Further, the address change circuit 102 changes a section address (A22 . . . A15) indicating a sector (a memory region) among the addresses of the memory cell array 10, to a section address indicating the boot sector (the second memory region), but does not change the address (A14 . . . A0) in the sector (the memory region). Accordingly, the address change circuit 102 changes only the sector address to the address of the boot sector, but uses the address in the sector as it is. Thus, data can be read from the boot sector.

Furthermore, the address change circuit 102 changes a section address corresponding to a normal sector in the memory cell array 10, to the address of the boot sector.

In FIG. 5, the inverter 104, the inverter 106, and the NOR circuit 108 of the address change circuit 102 are shown only one each, for ease of explanation. In an actual circuit, however, the 23 bits of address A22 . . . A0 are input to the address change circuit 102 in parallel, and the 15 bits of A14 . . . A0 are respectively input to the inverters 104 and the inverters 106 while the 8 bits of A22 . . . A15 are respectively input to the inverters 104 and the NOR circuits 108 in the address change circuit 102. The same also applies to the structure shown in FIG. 10.

The read control circuit 74 and the address change circuit 102 of the first embodiment are characterized by providing higher security than the address change circuit disclosed in Patent Document 2. The address change circuit disclosed in Patent Document 2 is designed to output data whether a correct password is input or an incorrect password is input. This address change circuit is formed with a parallel shifter circuit that shifts an address signal from an address buffer in accordance with the value of its password. More specifically, only in a case where a password is input, is an address signal shifted by the value of the password. In any other cases, an address signal is shifted by the corresponding amount to an input address. Accordingly, an unauthorized person can grasp the rules to hack the protected memory region. In the first embodiment, on the other hand, an unauthorized access to an address in the protected first memory region is changed to an access to an address in the non-protected second region by the read control circuit 74 and the address change circuit 102. Accordingly, there exist no such rules as above. Thus, the read control circuit 74 and the address change circuit 102 of the first embodiment are characterized by providing high security.

Figure 9:
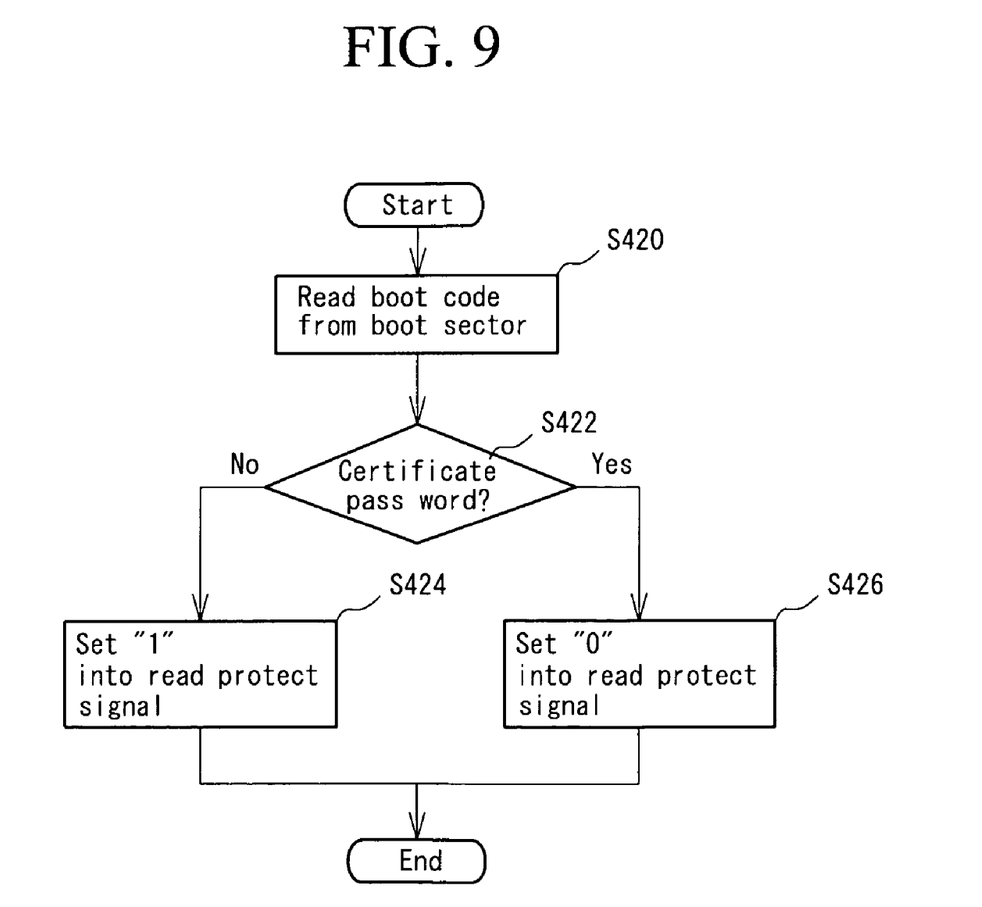
FIG. 9 is a flowchart of the operation to be performed after a boot code is read from the boot sector in the non-volatile memory in accordance with the first embodiment.

FIG. 9 is a flowchart of an operation to be performed after a boot code is read from the boot sector. As shown in FIG. 9, since reading from the normal sectors is protected at the time of system boot as shown in FIG. 7, the boot code is read from the boot sector (step S420). The read control circuit 74 determines whether an internal password (that may be contained in the boot code) matches an external password (step S422). If the internal password matches an external password ("YES" in step S422), the read control circuit 74 sets "0" into the read protection signal (step S426). After that, the address change circuit 102 does not change the input address, and the read control circuit 74 reads data from the sector designated by the input address. If the internal password does not match an external password ("NO" in step S422), the read control circuit 74 sets "1" into the read protection signal (step S424). The address change circuit 102 then changes the input address to the address of the boot sector. The read control circuit 74 prohibits data reading from the normal sectors, and reads data from the boot sector.

As described above, in a case where an internal password (authentication data) read from the boot sector (the second memory region) matches an external password that is input from the outside (external authentication data), the address change circuit 102 does not change the address. Accordingly, the read protection is canceled at the time of system boot, and the normal sector designated by the input address can be selected. If the internal password (the authentication data) read from the boot sector (the second memory region) matches the external password (the external authentication data) input from the outside, the read control circuit 74 allows reading from (or access to) the designated normal data (the first memory region). Accordingly, data reading from the designated normal sector is enabled. The authentication data storage region that is provided in a non-volatile memory and stores a password may be a boot sector as in the first embodiment, but it may be any sector other than the first memory region that is protected with a password or a memory region outside the memory cell array 10. The authentication data may be other authentication data than a password.

Figure 10:
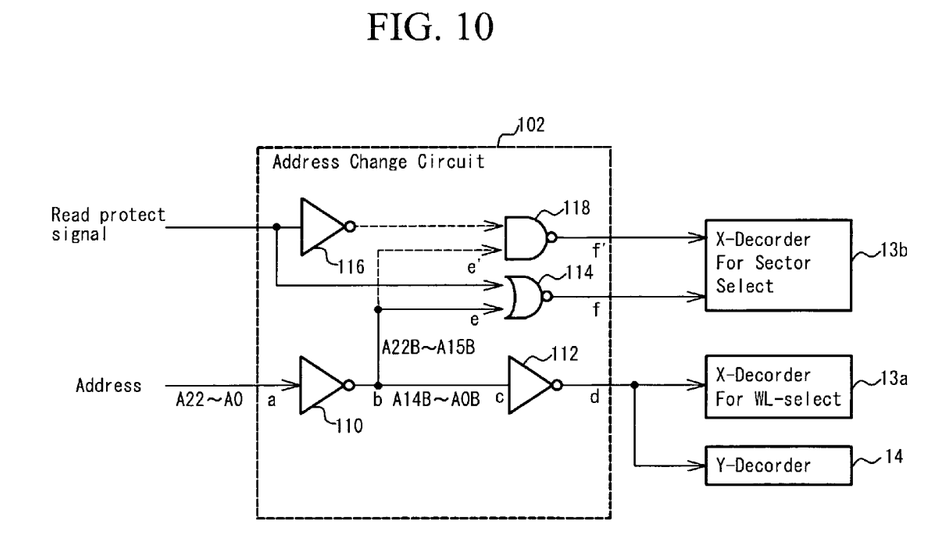
FIG. 10 illustrates another example of the address change circuit.
Figure 11:
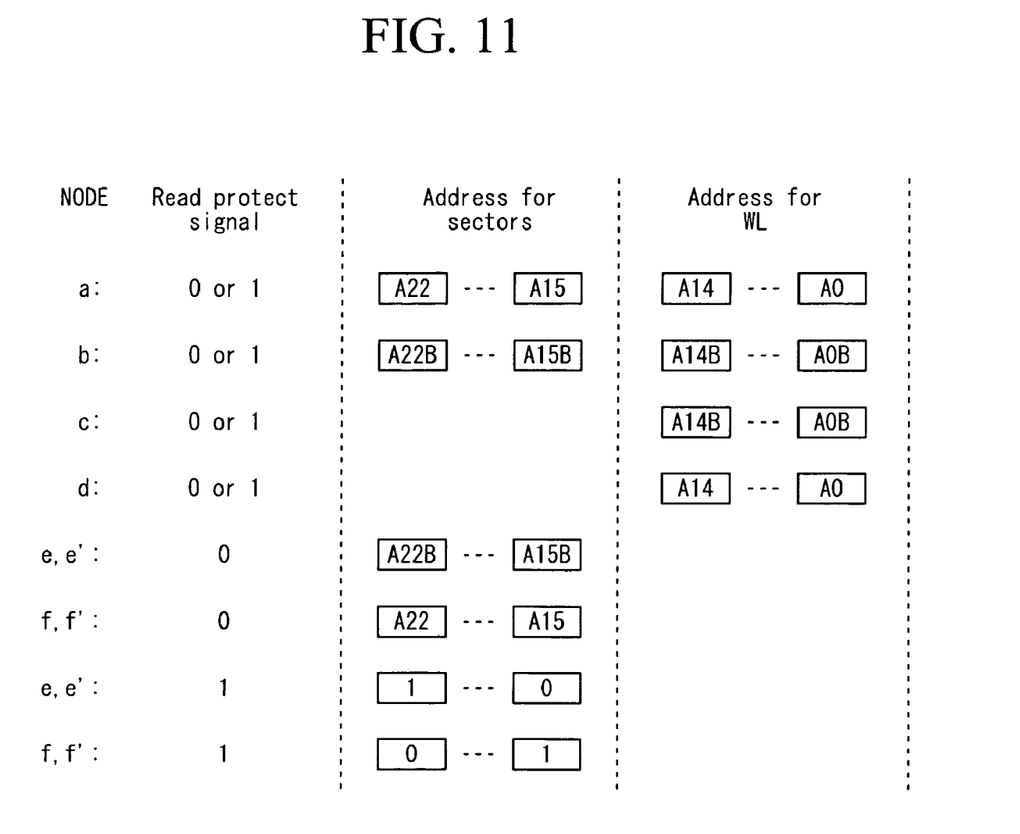
FIG. 11 illustrates the operation of the address change circuit shown in FIG. 10.

Although FIGS. 5 and 7 show an example structure in which the boot sector is located at the bottom of the memory cell array 10, FIGS. 10 and 11 illustrate the address change circuit 102 operating in a case where the boot sector is located in the middle of the memory cell array 10. As shown in FIG. 10, a part of an input address is input to the WL-selecting X-decoder 13a and the Y-decoder 14 via inverters 110 and 112. Another part of the address is input to a NOR circuit 114 via the inverter 110. The NOR circuit 114 also receives a read protection signal, and outputs data to the sector-selecting X-decoder 13b. Yet another part of the address is input to a NAND circuit 118 via the inverter 110. The NAND circuit 118 also receives a read protection signal via an inverter 116, and outputs data to the sector-selecting X-decoder 13b.

FIG. 11 shows address data at the node a through f shown in FIG. 10. At the node a, a sector address represented by A22 . . . A15 and a WL address represented by A14 . . . A0 are input, regardless of the read protection signal. At the node b, the inverter 110 inverts the address data to A22B . . . A15B and A14B . . . A0B. At the node c, only the WL address of the address data remains A14B . . . A0B. At the node d, the inverter 112 inverts the WL address data to A14 . . . A0. In this manner, the WL address data A4 . . . A0 is input to the WL-selecting X-decoder 13a and the Y-decoder 14, regardless of the read protection signal.

Meanwhile, at the node e, only a part of the sector address A22B ... A15B, for example, only A22B is input to the NOR circuit 114. The read protection signal is also input to the NOR circuit 114. If the read protection signal is "0" (reading is not to be protected) at the node f, the NOR circuit 114 outputs the sector address A22 to the sector-selecting X-decoder 13b. If the read protection signal is "1" (reading is to be protected) at the node f, the NOR circuit 114 outputs a sector address "0" to the sector-selecting X-decoder 13b.

At the node e', a part of the sector address A22B ... A15B, for example, only A15B is input to the NAND circuit 118. The read protection signal is also input to the NAND circuit 118 via the inverter 116. If the read protection signal is "0" (reading is not to be protected) at the node f', the NAND circuit 118 outputs the sector address A15 to the sector-selecting X-decoder 13b. If the read protection signal is "1" (reading is to be protected) at the node f', the NAND circuit 118 outputs a sector address "1" to the sector-selecting X-decoder 13b.

As described above, the address change circuit 102 is designed to select a bit via the NOR circuit 114 and a bit via the NAND circuit 118 from the sector address bits A22 ... A15. Thus, a desired sector can be made a boot sector.

FIGS. 5 and 7 show an example structure in which the boot sector is located at the bottom of the memory cell array 10, and FIGS. 10 and 11 show an example structure where the boot sector is located in the middle of the memory cell array 10. However, it is of course possible to form an address change circuit in the same manner as above in a case where the boot sector is located at the top of the memory cell array 10.

Although the first memory region is the normal region and the second memory region is the boot region in the first embodiment, the first memory region should be a memory region in which reading is protected, and the second memory region should be a memory region in which reading is not protected. Also in the first embodiment, data is to be read from the first memory region and the second memory region, and reading is protected in the first region. However, the activity to be protected is not limited to reading. In a case where accesses are to be made to the first memory region and the second memory region, accesses should be protected in the first region.

The setting and canceling of read protection in the first memory region does not depend only on whether the data authentication shows matching or mismatching at the time of system boot, but read protection may be automatically set in the non-volatile memory after a read access is made to the first memory region in which read protection has been canceled. This automatic protect setting may be performed with the corresponding read command or the corresponding read end command. The automatic protect setting may also be set with a protect command for setting read protection, after a read access is made to the first memory region in which read protection has been canceled. In this manner, even after read protection is canceled, as a result of authentication data matching, in the first memory region protected after system boot, the data stored in the first memory region can be protected all the time, except during the period of data reading/ programming (writing and erasing) in the first memory region.

The operation according to the present invention is effective not only at the time of system boot, but is also effective when the semiconductor device is to be reset. Thus, the first memory region can be protected from hacking.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A semiconductor device comprising:
    a memory cell array that includes non-volatile memory cells;
    a first memory region and a second memory region that are located in the memory cell array, the first memory region being protected during a protecting period, the second memory region being not protected;
    an address change circuit that changes an address in an address space of the first memory region and the second memory region in the memory cell array, to an address in an address space of the second memory region, during the protecting period; and
    a control circuit that prohibits access to the first memory region, and allows access to the second region, during the protecting period.

2. The semiconductor device as claimed in claim 1, wherein the address change circuit changes an external address that indicates the first memory region and is input to the semiconductor device, to an internal address that indicates the second memory region in the memory cell array.

3. The semiconductor device as claimed in claim 1, wherein the control circuit allows access to the first memory region, when authentication data that is read from an authentication data storage region for storing the authentication data matches external authentication data that is input from the outside.

4. The semiconductor device as claimed in claim 1, wherein the address change circuit does not change the address, when authentication data that is read from an authentication data storage region for storing the authentication data matches external authentication data that is input from the outside.

5. The semiconductor device as claimed in claim 2, wherein the address change circuit changes a section address indicating a memory region to an address indicating the second memory region, but does not change an address in the memory region, the section address being an address in the memory cell array.

6. The semiconductor device as claimed in claim 5, wherein the address change circuit changes a section address indicating the first memory region to a section address indicating the second memory region.

7. The semiconductor device as claimed in claim 1, wherein the second memory region is a boot data region in which a system code or program is stored.

8. A method of controlling a semiconductor device that has a memory cell array including non-volatile memory cells, a first memory region that is to be protected during a protecting period, and a second memory region that is not to be protected, the first memory region and the second memory region being located in the memory cell array,
    the method comprising the steps of:
    changing an address in an address space of the first memory region and the second memory region in the memory cell array, to an address in an address space of the second memory region, during the protecting period; and
    prohibiting access to the first memory region, and allowing access to the second memory region, during the protecting period.

9. The method as claimed in claim 8, further comprising the step of
    allowing access to the first memory region, when authentication data that is read from an authentication data storage region for storing the authentication data matches external authentication data that is input from the outside.

10. The method as claimed in claim 9, wherein the address is not changed, when authentication data that is read from an authentication data storage region for storing the authentication data matches external authentication data that is input from the outside.

* * * * *